US007260779B2

(12) United States Patent
Keyser et al.

(10) Patent No.: US 7,260,779 B2
(45) Date of Patent: Aug. 21, 2007

(54) METHODS AND APPARATUS FOR AUTOMATIC PAGE BREAK DETECTION

(75) Inventors: Paul Turquand Keyser, Mount Kisco, NY (US); Michael Peter Perrone, Yorktown, NY (US); Eugene H. Ratzlaff, Hopewell Junction, NY (US); Jayashree Subrahmonia, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 11/240,605

(22) Filed: Sep. 30, 2005

(65) Prior Publication Data

US 2006/0031764 A1 Feb. 9, 2006

Related U.S. Application Data

(63) Continuation of application No. 09/624,963, filed on Jul. 25, 2000.

(60) Provisional application No. 60/196,808, filed on Apr. 13, 2000.

(51) Int. Cl.
G06F 15/00 (2006.01)
(52) U.S. Cl. ...................... 715/525; 382/187
(58) Field of Classification Search ............... 715/513, 715/517, 525, 530; 382/187
See application file for complete search history.

(56) References Cited

U.S. PATENT DOCUMENTS 5,454,046 A * 9/1995 Carman, II ................ 382/186
5,805,118 A * 9/1998 Mishra et al. .............. 345/1.1
5,838,819 A * 11/1998 Ruedisueli et al. ......... 382/187
5,909,221 A * 6/1999 Nakai et al. ................ 345/619
5,911,146 A * 6/1999 Johari et al. ................ 715/525
6,128,633 A * 10/2000 Michelman et al. ........ 715/525
6,502,114 B1 * 12/2002 Forcier ....................... 715/541
6,816,615 B2 * 11/2004 Lui et al. .................... 382/187

OTHER PUBLICATIONS

D. Grotta et al., "Digitize Your Doodles," PC Magazine, http://www.zdnet.com/products/content/pcmg/1713/325704.html, 2 pages, Jul. 1, 1998.

* cited by examiner

Primary Examiner—Stephen Hong
Assistant Examiner—Kyle R Stork
(74) Attorney, Agent, or Firm—Anne V. Dougherty; Ryan, Mason & Lewis, LLP

(57) ABSTRACT

In one aspect of the present invention, page breaks are identified in the following manner. A set of ink data and a document description are processed by a variety of scoring methods, each of which generates a score for each possible insertion point in the ink. These scores are combined to produce a ranked list of hypothesized page breaks for the corresponding ink data. This ranked list is then used either to insert page breaks automatically using a predefined threshold to determine a cut-off in the list; or to present, on-line, to a human for verification/approval; or a mixture of the two based on two thresholds: one for automatic insertion and the other for human verification. It is to be understood not all scoring methods need be used, that is, one or more of the scoring methods may be used as needed.

16 Claims, 11 Drawing Sheets

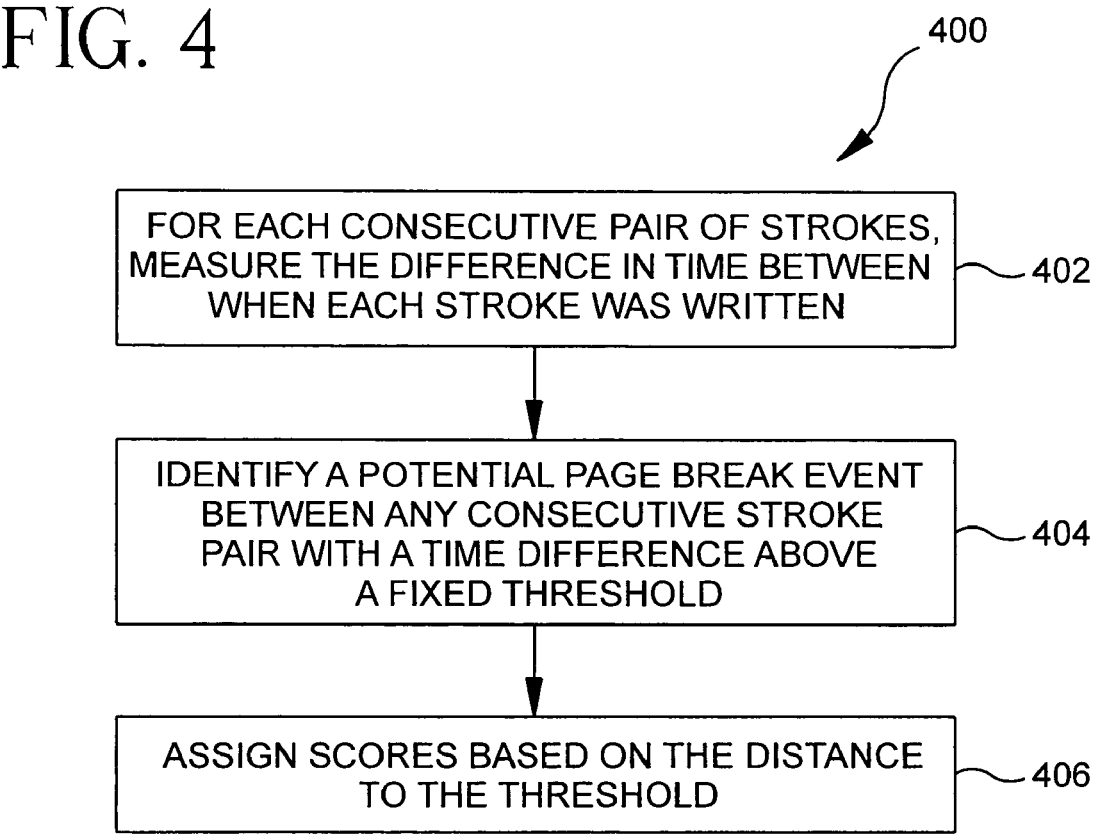
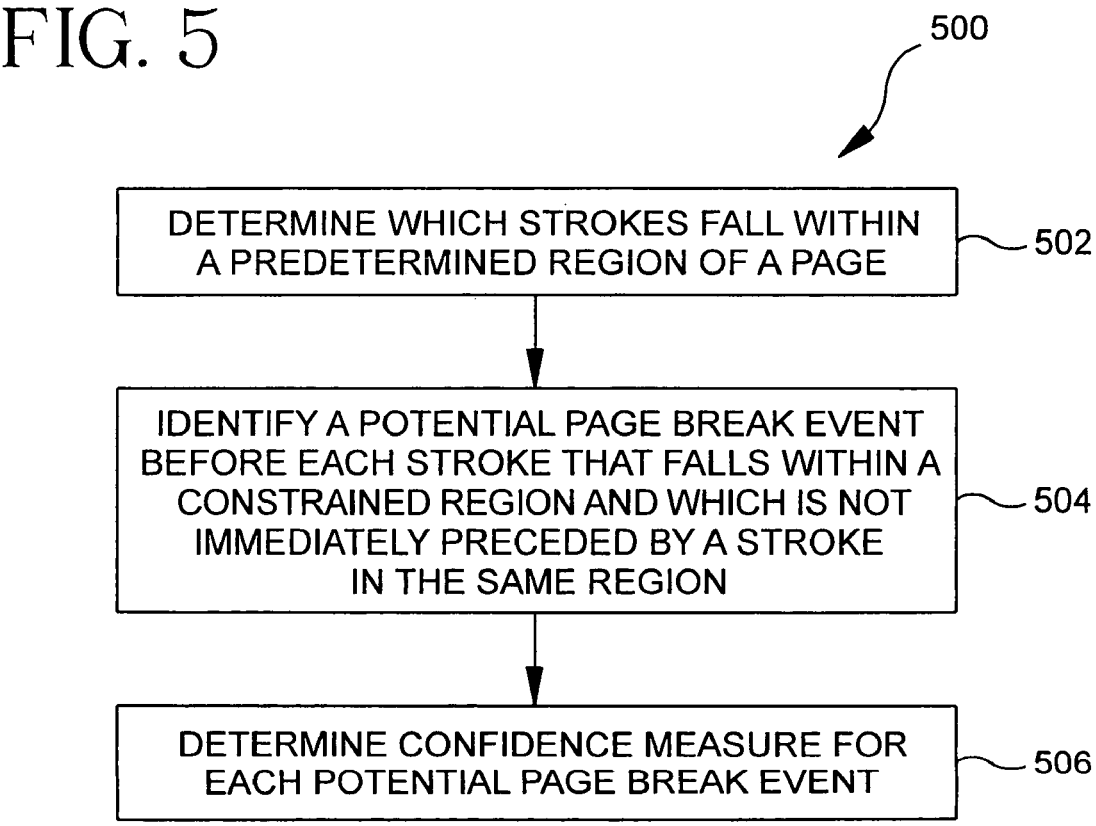

FIG. 6

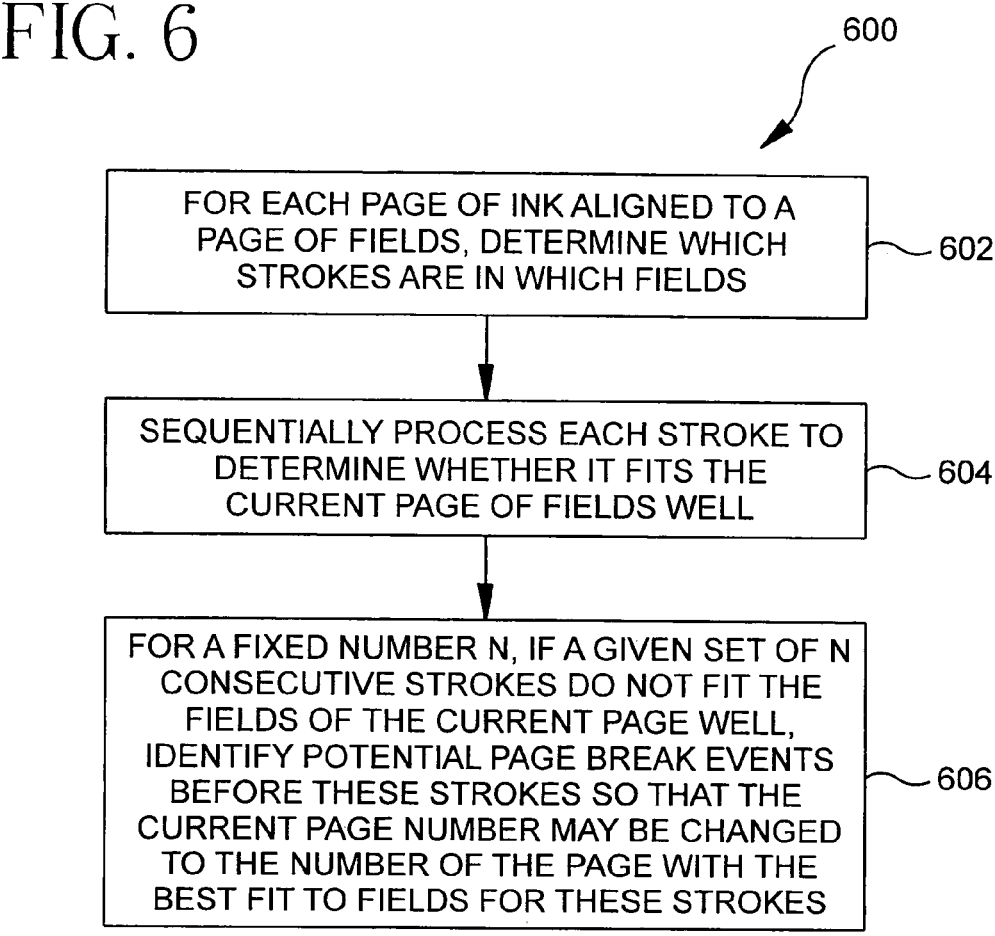

602 — FOR EACH PAGE OF INK ALIGNED TO A PAGE OF FIELDS, DETERMINE WHICH STROKES ARE IN WHICH FIELDS

604 — SEQUENTIALLY PROCESS EACH STROKE TO DETERMINE WHETHER IT FITS THE CURRENT PAGE OF FIELDS WELL

606 — FOR A FIXED NUMBER N, IF A GIVEN SET OF N CONSECUTIVE STROKES DO NOT FIT THE FIELDS OF THE CURRENT PAGE WELL, IDENTIFY POTENTIAL PAGE BREAK EVENTS BEFORE THESE STROKES SO THAT THE CURRENT PAGE NUMBER MAY BE CHANGED TO THE NUMBER OF THE PAGE WITH THE BEST FIT TO FIELDS FOR THESE STROKES

FIG. 7

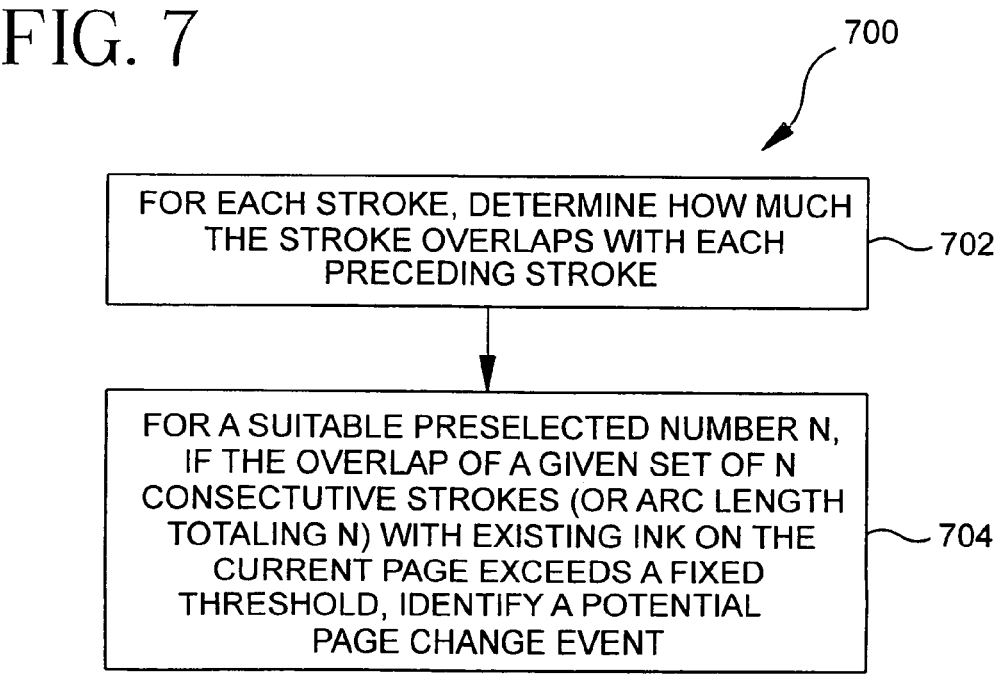

702 — FOR EACH STROKE, DETERMINE HOW MUCH THE STROKE OVERLAPS WITH EACH PRECEDING STROKE

704 — FOR A SUITABLE PRESELECTED NUMBER N, IF THE OVERLAP OF A GIVEN SET OF N CONSECUTIVE STROKES (OR ARC LENGTH TOTALING N) WITH EXISTING INK ON THE CURRENT PAGE EXCEEDS A FIXED THRESHOLD, IDENTIFY A POTENTIAL PAGE CHANGE EVENT

METHODS AND APPARATUS FOR AUTOMATIC PAGE BREAK DETECTION

CROSS-REFERENCE TO RELATED APPLICATION(S)

This application is a continuation of U.S. application Ser. No. 09/624,963 filed on Jul. 25, 2000, which claims the benefit of U.S. Provisional Application Ser. No. 60/196,808 filed on Apr. 13, 2000, the disclosures of which are incorporated herein by reference.

FIELD OF THE INVENTION

The present invention relates generally to personal digital notepads and the like and, more particularly, to methods and apparatus for providing automatic page break detection in accordance with such personal digital notepads and the like.

BACKGROUND OF THE INVENTION

A personal digital notepad (PDN) is a digitizer-and-pen device that allows a writer to record handwritten information on a standard paper notepad, and simultaneously record an electronic carbon copy of the writing in electronic form. The CrossPad marketed by the A.T. Cross Company is an example of such a device as is the IBM ThinkScribe. For such a device to be useful, the electronic ink on the electronic page must mirror the physical ink on the paper page. In order to maintain this accurate correspondence between the physical page and the electronic copy, the writer is required to "turn" the electronic page when changing to a new or previous paper page by pressing the corresponding page-forward or page-backward button on the PDN. These buttons effect synchrony between the physical and electronic page by recording these events in the data stream. Asynchrony between the paper and electronic pages occurs when a writer forgets to press the appropriate button on the device or accidentally presses the button too many times. Subsequent writing is then electronically recorded on the wrong electronic page, and the new electronic ink is recorded on top of the page's original electronic ink. This problem may be compounded since the user may flip forward or backward by several pages at a time and may do so several times within a single document. Later, when the resultant electronic page is viewed, the merged original and overwritten electronic ink can be confusing and may be difficult to read and correct.

Ink data collected by a PDN is recorded as a sequence of triplets (X, Y, T) corresponding to the horizontal position, the vertical position, and the timestamp, respectively, of the pen tip on the page. These triplets may be sent to a personal computer (PC) in real-time or stored on the PDN and uploaded at the writer's convenience. Thus, manipulations of this data may be performed in real-time, possibly with writer-intervention, or they may be performed at any later time as a post-processing step. In addition to the triplets, the PDN may also include other information, called events, in its data stream, such as the location of the pen (on/off the paper) and whether the writer has activated any special purpose buttons on the device. For the purposes of the present invention, we need only concern ourselves with the triplets, page forward/backward events and document description information.

SUMMARY OF THE INVENTION

The present invention eliminates, or at least substantially reduces, the problem described above by providing an automated method for assigning electronic ink to electronic pages such that the correspondence between the electronic ink and the electronic pages matches the correspondence between the physical ink and the physical page, as closely as possible. The methodologies may use the location and/or time information associated with the handwritten data to detect the number and location of page breaks in handwritten data. Other criteria may be used to perform such detection, e.g., constrained regions, field alignment, degree of ink overlap, neural networks, etc. The method may apply to accidentally omitted page change events and, in certain cases, to accidentally added page change events. However, other applications of the methodologies of the invention may be realized by those of ordinary skill in the art.

Typically, writers fill out a page from top to bottom; when they finish a page and start writing on the next page, the vertical position of their ink makes a large jump from the bottom of a page to the top. Thus, for typical writing, detecting this abrupt change in position should be sufficient to detect page breaks; however, this picture is rendered more complex in at least three ways. First, writers may make corrections as they write, leading to possibly large jumps in the vertical position of their ink, which do not correspond to page breaks. Second, writers are not constrained to begin new pages at the top of the page and therefore may start a new page by writing at the bottom of the page (e.g., a page number). Third, writers are not constrained to write in a top-down fashion (e.g., a writer fills the top third of a page, leaves a blank area in the middle of the page, writes in the bottom third, and then fills in the medial blank space, after which they also fail to signal a page forward/backward event).

To overcome, or at least reduce, problems associated with such user actions, in one broad aspect of the invention, a method of processing an electronic document generated in accordance with a handwriting system comprises the steps of: obtaining electronic ink data from the handwriting system, the ink data being associated with the electronic document; and automatically identifying, using at least a portion of the electronic ink data, one or more potential page breaks for possible insertion in the electronic document to maintain a page correspondence between the electronic document and a physical document also generated in accordance with the handwriting system.

In a more specific aspect of the present invention, page breaks may be identified in the following manner. A set of ink data and a document description are processed by a variety of scoring methods, each of which generates a score for each possible insertion point in the ink. These scores are combined to produce a ranked list of hypothesized page breaks for the corresponding ink data. This ranked list is then used either to insert page breaks automatically using a predefined threshold to determine a cut-off in the list; or to present, on-line, to a human for verification/approval; or a mixture of the two based on two thresholds: one for automatic insertion and the other for human verification. It is to be understood not all scoring methods need be used, that is, one or more of the scoring methods may be used as needed.

Note, the methods described in accordance with the present invention do not assume any particular spatial/temporal resolution of position/timestamp value and, in particular, they work without regard for whether there are or are not duplicated (X, Y, T) values in the data. However, some of the methods described herein may not optimally work without the timestamp information (e.g., if the ink data were converted to a raster format.)

In the following descriptions, we assume that a writer from a culture that normally writes a page from top to bottom has written the ink; however, it is to be understood that this assumption is for ease of description only. The methods described herein can be trivially modified to handle writing that progresses from right-to-left or bottom-to-top, etc.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a flow diagram illustrating a temporal delta scoring method according to one embodiment of the present invention;

FIG. 5 is a flow diagram illustrating a constrained region scoring method according to one embodiment of the present invention;

FIG. 6 is a flow diagram illustrating a field alignment scoring method according to one embodiment of the present invention;

FIG. 7 is a flow diagram illustrating a ink overlap scoring method according to one embodiment of the present invention;

DETAILED DESCRIPTION OF PREFERRED EMBODIMENTS

Figure 1:
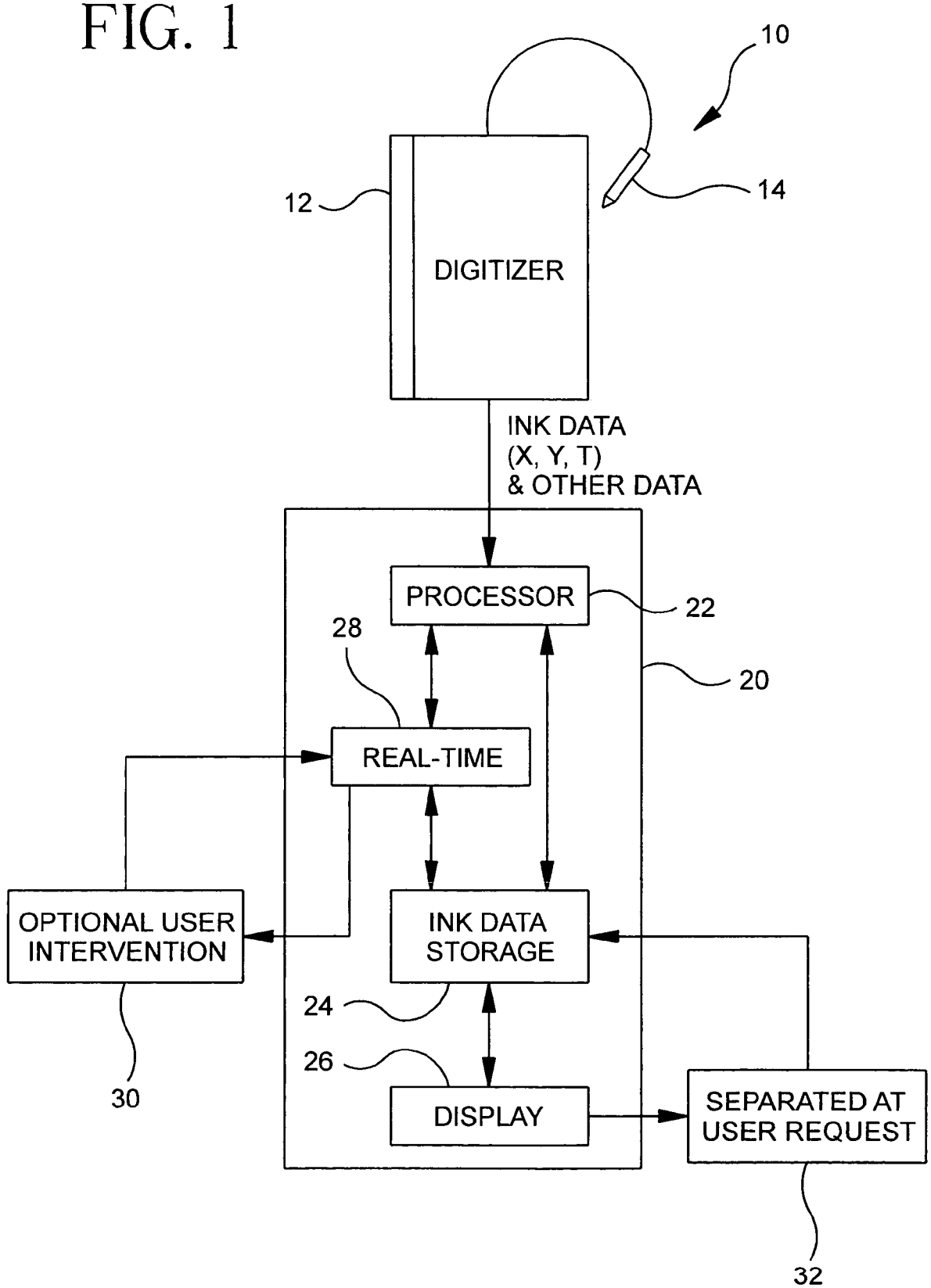
FIG. 1 is a block diagram illustrating a system in which the automatic page break detection methodologies of the present invention may be employed.

The present invention will be explained below in the context of an illustrative personal digital notepad architecture. However, it is to be understood that the present invention is not limited to any particular handwriting system architecture. Rather, the invention is more generally applicable to any handwriting system architecture in which it is desirable for the system to automatically maintain an accurate correspondence between a physical page and an electronic page.

Before presenting respective explanations of illustrative embodiments associated with the present invention, some definitions that may be used during the course of such explanations will first be provided below.

(i) Ink Point: Numerical triplet (X, Y, T) respectively indicating the x and y spatial coordinates of some ink on a paper page and the time, t, when it was written.

(ii) Pen-down: The first ink point recorded after the pen is placed on a page.

(iii) Pen-up: The last ink point recorded before the pen is lifted up from a page.

(iv) Stroke: The actual ink written on a page or the electronic representation of the ink written on a page between a pen-down and a pen-up.

(v) Arc Length: The sum of the distances between consecutive points of (a set of) strokes.

(vi) Timestamp: Time when a stroke or ink point was written. Note that for a stroke, the time stamp may be any or all of the times between and including the time of the pen-down and pen-up.

(vii) Delayed Stroke: Stroke which is spatially close to a group of other strokes to which it belongs; but which is separated in time from the group. Other strokes may intervene temporally between the delayed stroke and the group of strokes to which it corresponds. For example, if the word "Mississippi" is written in cursive style, the i-dots may all be delayed strokes. Similarly, a person may forget to cross a "t" in a word; write additional unrelated ink strokes; notice the missing t-cross; and go back and insert it.

(viii) Insertion Point: Position in a time-ordered list of strokes between any two consecutive strokes in the list.

(ix) Page Change Event: A marker used to indicate either an increase or decrease in the page number assigned to subsequent ink strokes. For example, strokes may be written on pages 1, 2 and 3. After these strokes are written, new strokes may be written on page 1 and then the writer may jump to page 4, etc. So the page numbering of the strokes ordered by their timestamp is: "111 . . . 1 222 . . . 2 333 . . . 3 111 . . . 1 444 . . . 4". If we indicate a generic stroke by "S" and an increasing/decreasing page change event by "+"/"−", then the page change events for this sequence of strokes would be: "SSS . . . S+SSS . . . S+SSS . . . S−−SSS . . . S+++SSS . . . S".

(x) Page break: The insertion point corresponding to when the writer actually moved from one physical page to another; page change events are desired for each page break.

(xi) Ink Document: A time-ordered list of strokes with page change events at zero or more of the insertion points.

(xii) Field: Predefined region on a written page.

(xiii) Document Description: Information about the location of fields, if any, on a page (e.g., a medical insurance form). May also include the (max/min) number of expected pages in a document.

(xiv) Vertical/Horizontal Position: Vertical position is the distance from the top of the page (increasing down the page). Horizontal position is the distance from the left side of the page (increasing to the right). These origins and sign conventions are so defined for specificity, and these definitions are not to be considered as limitations of the present invention. Both vertical and horizontal position are determined for a given stroke from the corresponding position of, for example, but not limited to, (a) the first point, or (b) the upper-left corner of the smallest rectangle enclosing all the points, or (c) the mean vertical position of all the points of the stroke (which mean may be determined by any of a variety of methods).

Referring initially to FIG. 1, a block diagram is shown illustrating an overview of a system in which the automatic page break detection methodologies of the present invention may be employed. As shown, the system may comprise a personal digital notepad (PDN) 10 which includes a digitizer 12 and a pen device 14. As mentioned, the PDN may, for example, be an IBM ThinkScribe or an A.T. Cross Company CrossPad. It is to be understood that while the pen 14 and digitizer 12 are shown as being connected via a cable, this is only an illustrative connection mechanism. That is, other connection mechanisms may be employed, e.g., a radio transmitter/receiver pair, etc. The invention is not limited to any particular connection mechanism. As is known, the physical paper for capturing the physical ink from the pen device is positioned over the digitizing surface of the digitizer which captures the so-called electronic ink or the electronic representation of the physical ink marks made on the physical paper by the pen device. As mentioned, ink data collected by a PDN is recorded as a sequence of triplets (X, Y, T) corresponding to the horizontal position, the vertical position, and the timestamp, respectively, of the pen tip on the page.

These triplets may be sent to a personal computer (PC) 20, along with other data such as document description information, as shown in FIG. 1. The PDN 10 and PC 20 may be connected via any suitable conventional communication link. The PC 20 may include a processor 22, memory 24, and I/O devices such as, for example, display 24. Also, as is known but not illustrated, the PDN has its own processor, memory and I/O devices for implementing operations described herein. The ink data and other data may be processed by the PC in real-time or stored on the PDN and uploaded at the writer's convenience. Thus, manipulations of this data may be performed in real-time, possibly with writer-intervention (as depicted by blocks 28 and 30 in FIG. 1). Specifically, in this scenario, the PC processes the data from the PDN as the user is writing and then signals the user, e.g., via an audible beep, a flashing display, etc., when it is determined that a page change might be missing, thereby allowing the user to accept or reject a suggested page change event through a user interface on the PDN, e.g., depressing a button, writing a stroke on the screen, etc. Alternatively, manipulations of the data from the PDN may be performed at any later time as a post-processing step (as depicted by block 32 in FIG. 1). The display 26 may be used to view and/or edit the data associated with the handwriting. This may include automatically or manually adding/deleting/modifying page change events, e.g., separating data associated with one page into two or more pages. As mentioned, in addition to the triplets, the PDN may also include other information, called events, in its data stream, such as, for example, the location of the pen (on/off the paper) and whether the writer has activated any special purpose buttons on the device. As mentioned, for the purposes of the present invention, we need only concern ourselves with the triplets, page forward/backward events and document description information.

It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 2:
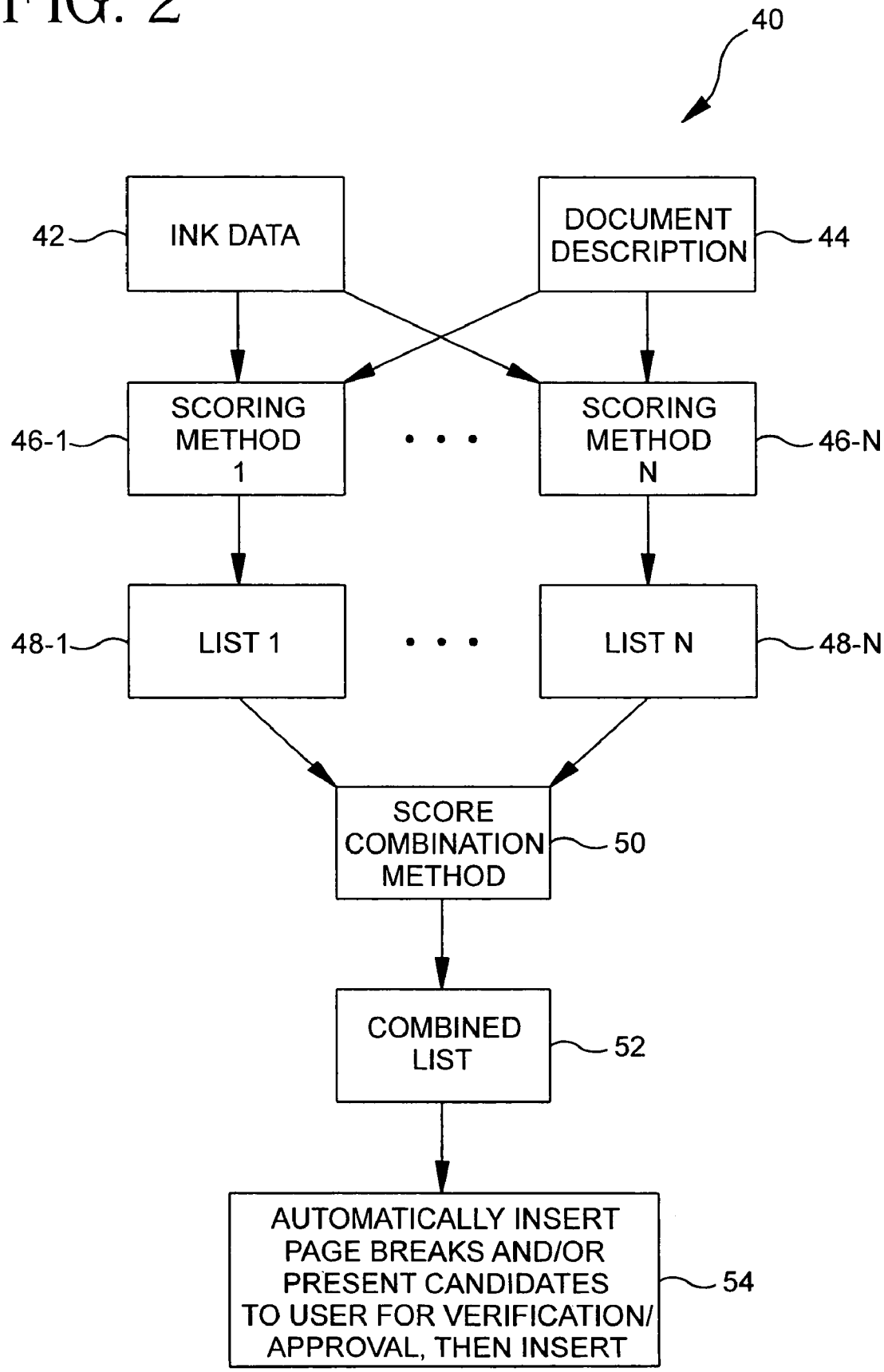
FIG. 2 is a flow diagram illustrating an overview of insertion point list generation according to one embodiment of the present invention.

It is to be appreciated that the scoring techniques and page break insertion operations of the invention used for automatically detecting and then inserting accurate page breaks, to be described below, may be performed on the personal computer 20 and/or on the PDN 10. FIG. 2 is a flow diagram of a preferred overview of a process for performing scored insertion point list generation according to an embodiment of the invention. In the preferred process 40 shown in FIG. 2, page breaks are identified in the following manner. A set of ink data 42 and a document description 44 are processed by a variety of scoring methods 46-1 through 46-N, each of which generates a list of scores (48-1 through 48-N, respectively) for each possible insertion point in the ink that is determined to be a potential page break event. A variety of illustrative insertion point scoring methods will be described below. These lists of scores are then combined via a score combination method 50, to be described below, to produce a ranked list 52 of hypothesized page breaks for the corresponding ink data. This ranked list is then used, in step 54, either to insert page breaks automatically using a predefined threshold to determine a cut-off in the list; or to present, on-line, to a human for verification/approval; or a mixture of the two based on two thresholds: one for automatic insertion and the other for human verification.

It is to be understood that not all scoring methods described below need be used, that is, one or more of the scoring methods may be used as needed. In the case where only one scoring method is used, no combination scoring operation is required. That is, the results of the individual scoring method are used to automatically insert page breaks and/or to generate a presentation of suggested page breaks to the user for verification approval.

Further, it is to be appreciated that, in addition to the scores returned by the scoring methods described below, an additional score (or composite score comprising the additional score and the score from a particular scoring method) can be assigned to each of the hypothesized insertion points using methods well-known to those skilled in the art. For example, the additional score could correspond to an estimate of the method's confidence in the hypothesized insertion point, e.g., a probability measure. These scores can then be used to rank the hypothesized insertion points. This may be done for one or more of the scoring methods as a last step in the individual scoring process (e.g., 46-1 through 46-N in FIG. 2) or at the beginning of the combination method 50, assuming the combination method is employed (i.e., when more than one scoring method is used).

In addition, while shown in parallel in FIG. 2, it is to be understood that the scoring methods may be performed in a sequential manner, wherein a given number of scoring methods are performed until a particular level of confidence is achieved in the results.

A variety of illustrative insertion point scoring methods (e.g., 46-1 through 46-N in FIG. 2) will now be described.

A. Spatial Delta Scoring

Figure 3:
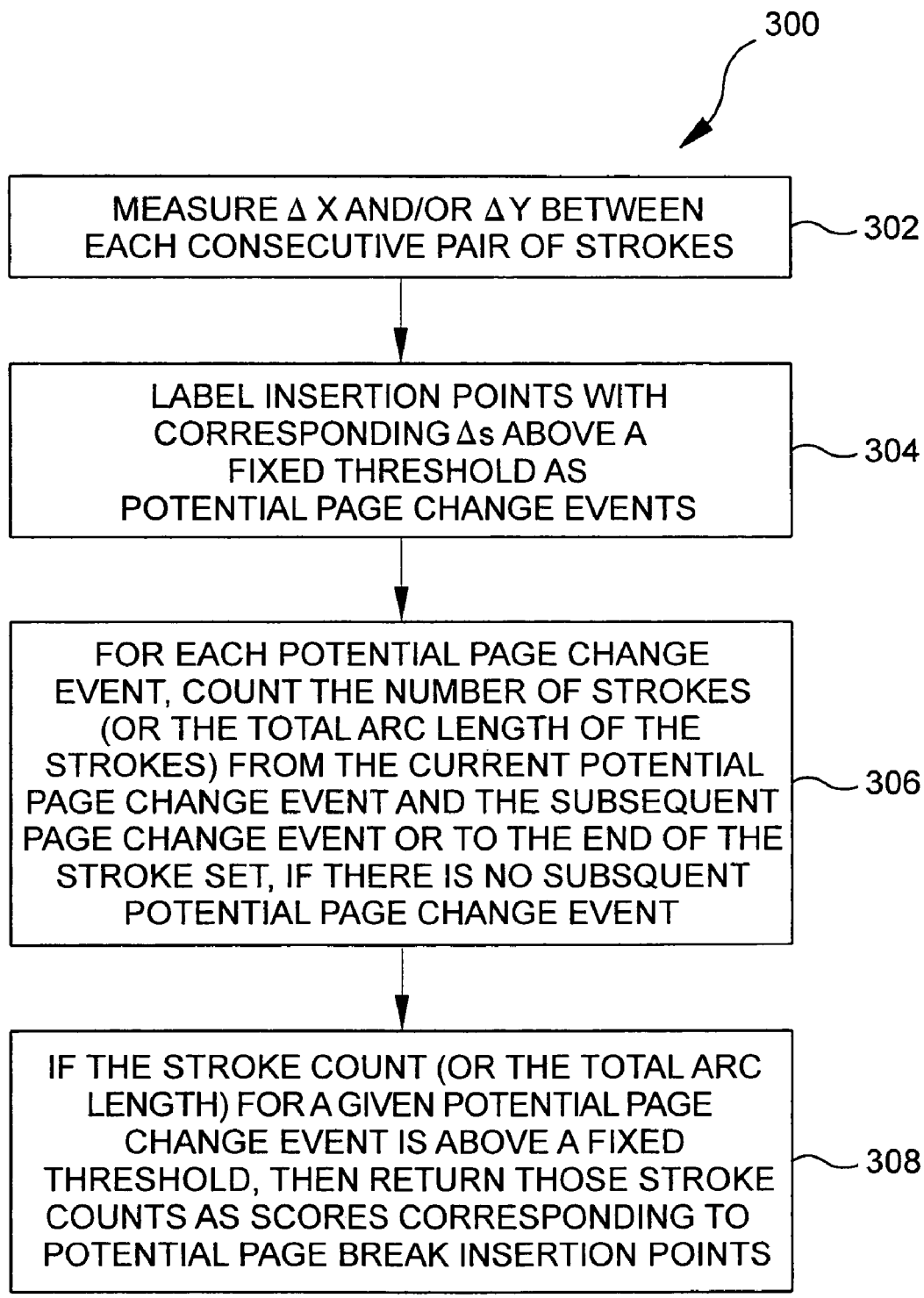
FIG. 3 is a flow diagram illustrating a spatial delta scoring method according to one embodiment of the present invention.

Referring now to FIG. 3, a flow diagram illustrating a scoring method 300 referred to as "spatial delta scoring" is shown. In accordance with the method 300, X and/or Y between each consecutive pair of strokes is measured in step 302. The refers to the position difference (X or Y) between the consecutive strokes in the pair. Next, in step 304, insertion points with corresponding s above a fixed threshold are labeled as potential page change events. For each potential page change event, the number of strokes (or the total arc length of the strokes) are counted, in step 306, from the current potential page change event and the subsequent potential page change event or to the end of the stroke set if there is no subsequent potential page change event. Lastly, in step 308, if the stroke count (or the total arc length) for a given potential page change event is above a fixed threshold, then return those stroke counts as scores corresponding to a potential page change insertion point. These scores correspond to one of the lists, e.g., lists 48-1 through 48-N, in FIG. 2.

B. Temporal Delta Scoring

Referring now to FIG. 4, a flow diagram illustrating a scoring method 400 referred to as "temporal delta scoring" is shown. In accordance with the method 400, for each consecutive pair of strokes, the difference in time between when each stroke was written is measured in step 402. In step 404, a potential page change event is identified between any consecutive stroke pair with a time difference above a fixed threshold. In step 406, scores are assigned to the potential page change events based on the distance to the threshold. These scores correspond to one of the lists, e.g., lists 48-1 through 48-N, in FIG. 2.

C. Constrained Region Scoring

Referring now to FIG. 5, a flow diagram illustrating a scoring method 500 referred to as "constrained region scoring" is shown. Examples of constrained regions may be: (i) a page number box: a boxed region in, for example, the corner of a page which is used exclusively to write the page number; and (ii) a page title line: a region, for example, above a prespecified line on a page which is used exclusively to write the title or other marker of the page. It is to be understood that such constrained region information is part of the document description information provided to the scoring method. In accordance with the method 500, it is first determined which strokes fall within a predefined region of a page in step 502. Then, in step 504, a potential page change event is identified before each stroke that falls within a constrained region and which is not immediately preceded by a stroke in the same region. A confidence measure is determined as a score for each potential page break, in step 506, wherein the confidence measure corresponds to a level of confidence that the stroke falls within the constrained region. These scores correspond to one of the lists, e.g., lists 48-1 through 48-N, in FIG. 2. It is to be understood that a page could have more than one constrained region. Further, it is to be understood that various definitions of when a stroke is "in" a region may be used. For example, a stroke may be "in" a region when: (i) the stroke is entirely in the region; (ii) a majority of the stroke is in the region; (iii) a beginning and/or an end point of the stroke is in the region; (iv) the stroke has a particular average distance to a region; and (v) its preceding and/or following N neighbor strokes are in the region, where N is a fixed number of neighbors to consider; see, e.g., the U.S. patent application identified as Ser. No. 09/240,147, filed on Jan. 29, 1999 in the name of M. P. Perrone, and entitled: "System and Methods for Providing Robust Keyword Selection in a Personal Digital Notepad," the disclosure of which is incorporated by reference herein.

D. Field Alignment Scoring

Referring now to FIG. 6, a flow diagram illustrating a scoring method 600 referred to as "field alignment scoring" is shown. For documents that have regions in which writing is expected to occur (e.g., forms), we can use the information about where the ink is expected/allowed to occur to decide whether a page change event is missing. It is to be understood that such field information is part of the document description information provided to the scoring method. In accordance with the method 600, for each page of ink aligned to a page of fields, in step 602, it is determined which strokes are "in" which fields. Here, "in" includes a measure of degree so that the appropriateness of one field versus another for any given stroke may be compared. In step 604, each stroke is sequentially processed to determine whether it fits the current page of fields well. Then, in step 606, for a fixed number N, if a given set of N consecutive strokes do not fit the fields of the current page well, potential page change events are identified before these strokes so that the current page number may be changed to the number of the page with the best fit to fields for these strokes. It is to be understood that any measure of fit may be employed, and it is that measure that is returned as a score. These scores correspond to one of the lists, e.g., lists 48-1 through 48-N, in FIG. 2.

E. Ink Overlap Scoring

Referring now to FIG. 7, a flow diagram illustrating a scoring method 700 referred to as "ink overlap scoring" is shown. This method is similar to the field alignment method except that instead of using predefined fields to constrain stroke placement, existing ink is used to define regions where new ink is not allowed. In accordance with the method 700, for each stroke, it is determined how much the stroke overlaps with each preceding stroke in step 702. This may be accomplished in a variety of conventional ways, for example, as is described in the above-referenced U.S. patent application identified as Ser. No. 09/240,147. In step 704, for a suitable preselected number N, if the degree of overlap of a given set of N consecutive strokes (or arc length totaling N) with existing ink on the current page exceeds a fixed threshold, a potential page change event is identified. The degree of overlap serves as a score. These scores correspond to one of the lists, e.g., lists 48-1 through 48-N, in FIG. 2. It is to be understood that delayed strokes occur frequently and usually overlap with existing ink; but they are usually short. Thus, for this method, the number N preferably includes more strokes and/or arc length than the criterion for field alignment.

F. Y-Position or X-Position Scoring

Figure 8A:
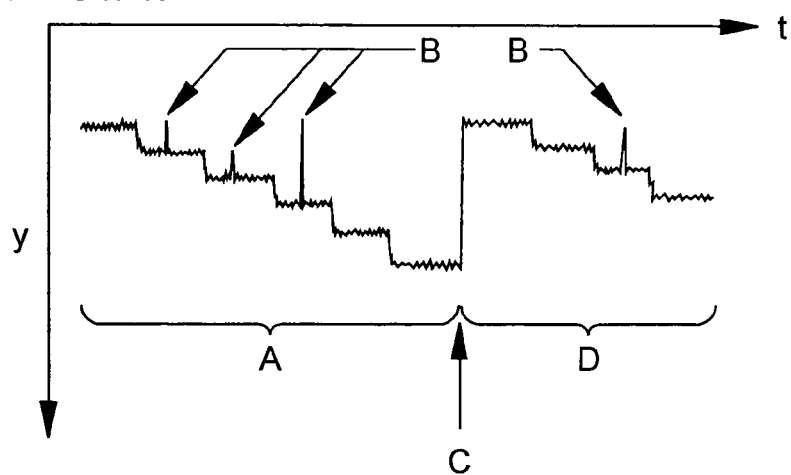
FIGS. 8A through 8C are graphical representations generally illustrating a position/timestamp scoring methodology according to the present invention.
Figure 8B:
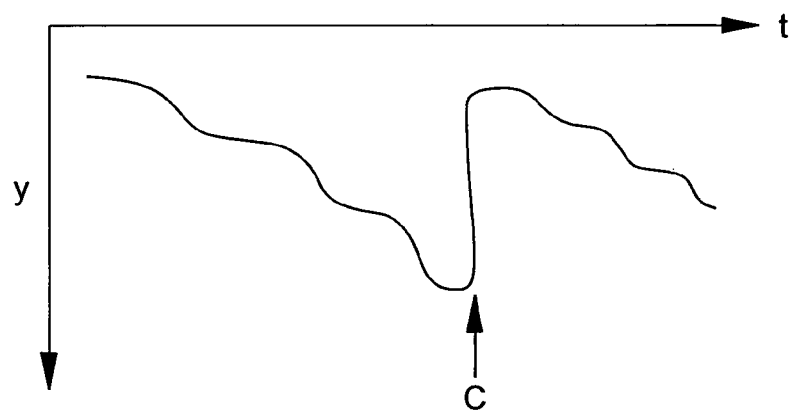
Figure 8C:
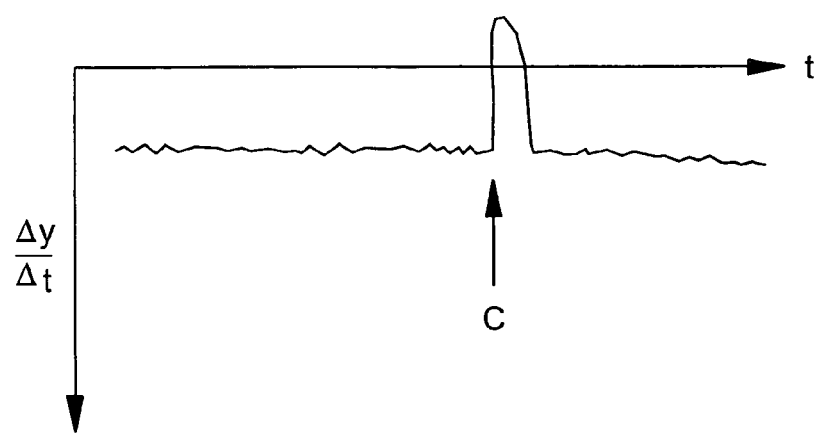

Before explaining details of position scoring methods (and timestamp scoring methods in the next section) of the invention, reference is made to FIGS. 8A through 8C, in which such a scoring technique associated with the y-position (and timestamps) of strokes is generally illustrated. FIG. 8A shows a graph of the y-position of strokes versus timestamp t. Section A of the graph denotes six lines of writing on page N, with some corrections denoted by the letter B. Letter C denotes a page break. Section D denotes four lines of writing on page N+1, with one correction B. As will be explained, in accordance with position scoring, the moving average of the y-values is taken, which is denoted in FIG. 8B with the page break shown as letter C. Then, a moving average of the slope of the curve in FIG. 8B is taken, which is denoted in FIG. 8C with the page break shown as letter C.

Figure 9A:
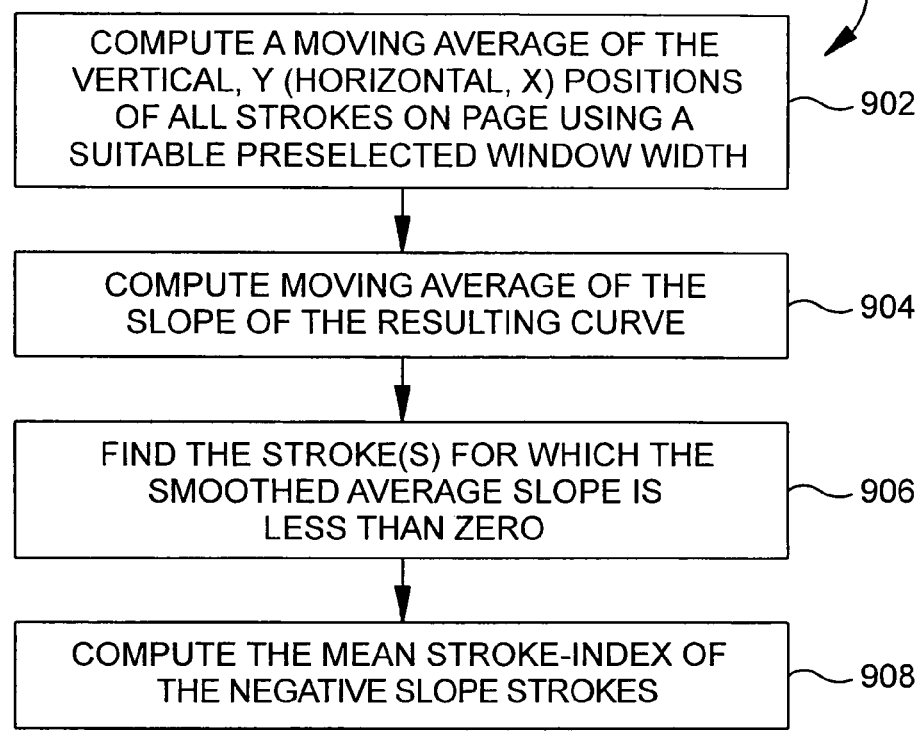
FIGS. 9A through 9C are diagrams illustrating a filtered position scoring method according to one embodiment of the present invention.
Figure 9B:
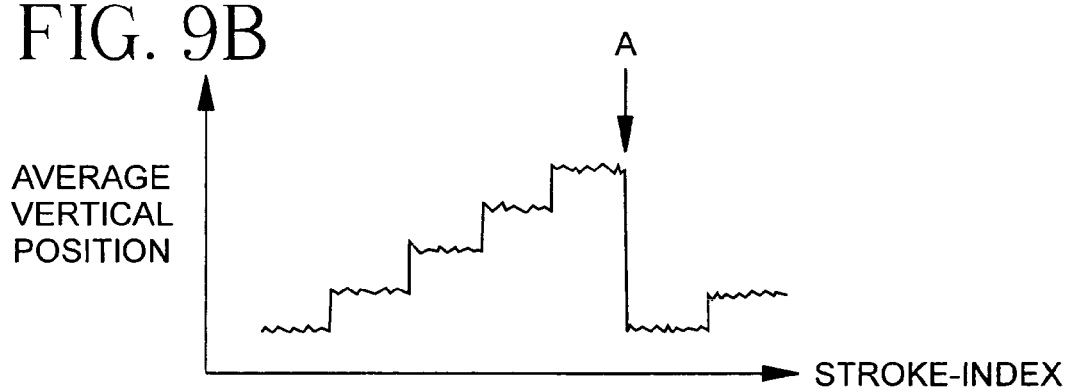
Figure 9C:
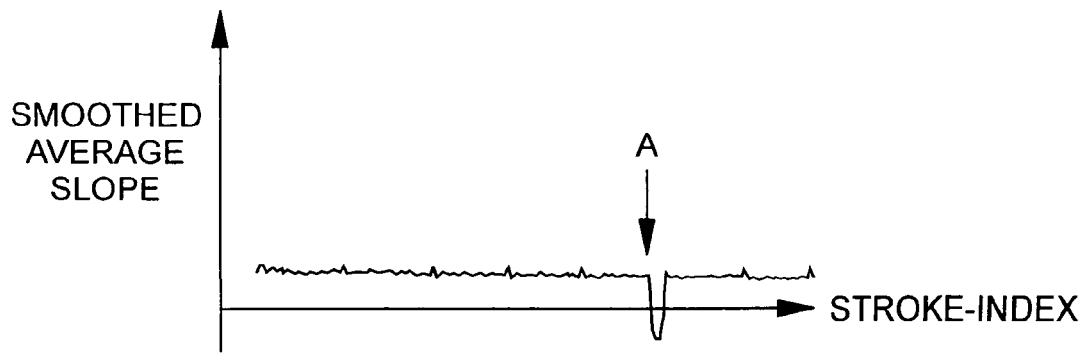

The position scoring method is described in more detail with respect to FIGS. 9A through 9C. It is to be understood that the position scoring technique for the y-position of strokes is identical to that for the x-position. Thus, the following explanation refers to the y-position explicitly, with the phrase "x-position" or "horizontal x" in parentheses to denote the similarity. Thus, in accordance with the position scoring method 900 shown in FIG. 9A, a moving average is computed of the vertical y-positions (horizontal x-position) of all strokes on the electronic page using a suitable preselected window width in step 902. The result of step 902 is illustrated in FIG. 9B, where A is a potential page break, the vertical axis is the average vertical (horizontal for x-position scoring) position and the horizontal axis is the "stroke-index" (or time-stamp for timestamp scoring). The stroke-index is defined as the index of the time-ordered strokes, i.e., stroke 1, stroke 2, stroke 3, etc. Note that if N>M, then stroke N was written after stroke M. It is to be understood that selecting a window width of zero turns off the moving average. Then, in step 904, the moving average of the slope of this resulting curve is computed. The result of step 904 is illustrated in FIG. 9C. In step 906, the stroke(s) for which the smoothed average slope is less than zero is found. Then, in step 908, the mean stroke-index of the negative slope strokes is computed or the negative peaks in the curve computed by the moving average are scored as possible page change events by any of a variety of methods of scoring peak-heights familiar to those skilled in the art. These scores correspond to one of the lists, e.g., lists 48-1 through 48-N, in FIG. 2.

Figure 10A:
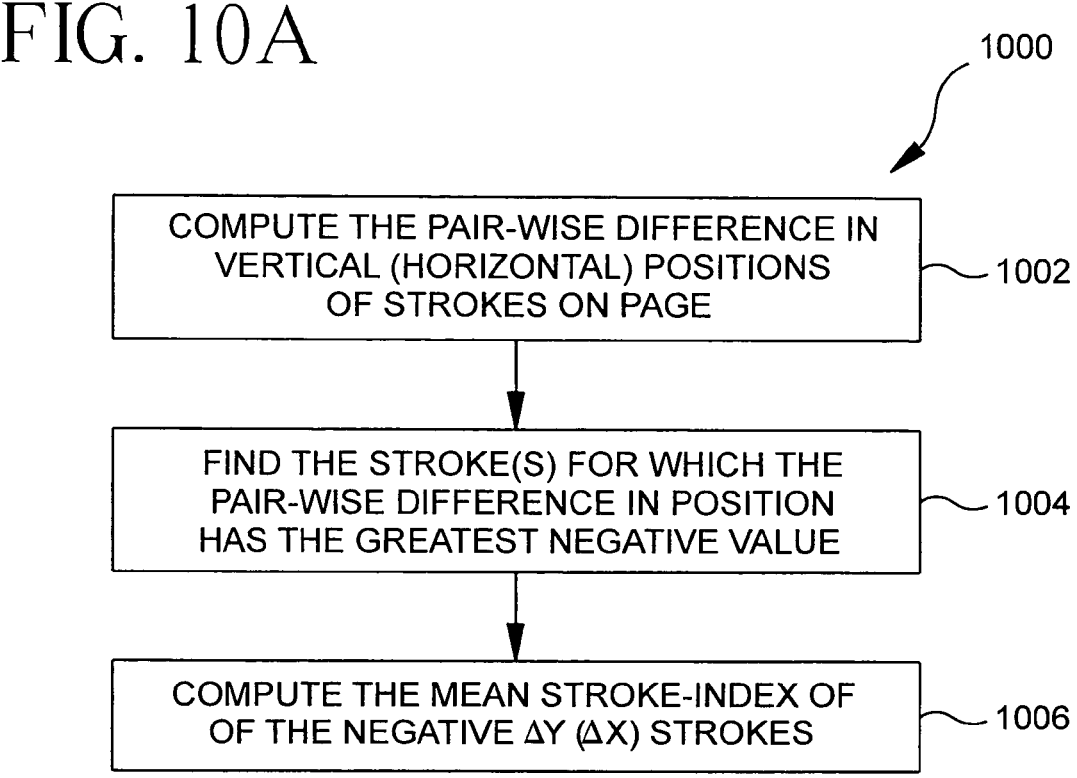
FIGS. 10A and 10B are diagrams illustrating an unfiltered position scoring method according to one embodiment of the present invention.
Figure 10B:
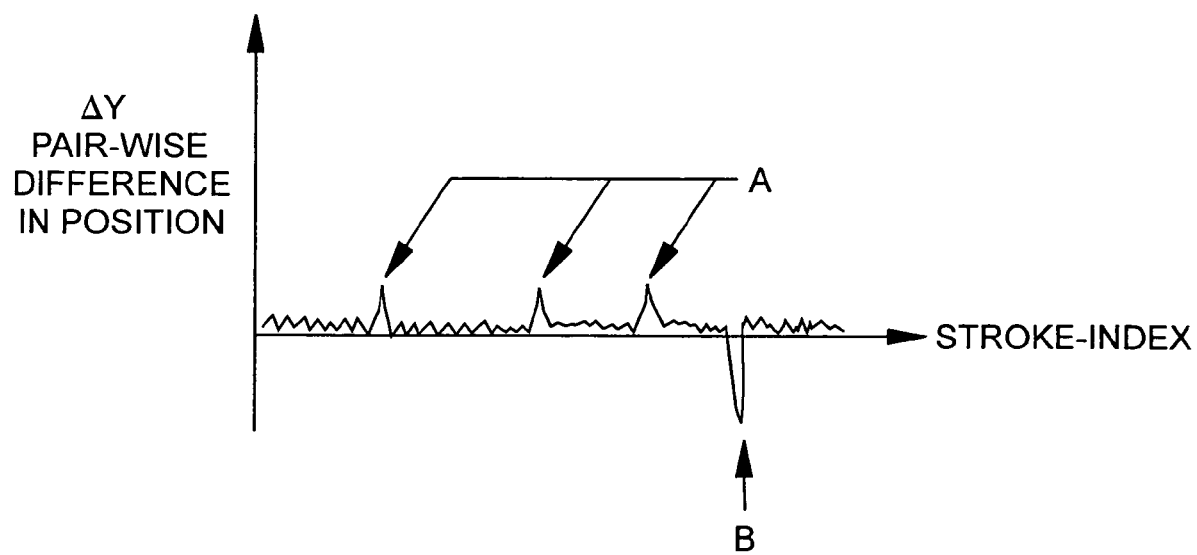

It is to be appreciated that FIGS. 9A through 9C illustrate a "filtered" position scoring method. Referring now to FIGS. 10A and 10B, an "unfiltered" position scoring method is shown. The concepts of "filtered" and "unfiltered" scoring are to be understood in the context of the notion of averaging. If the average is over N consecutive strokes, then "unfiltered" corresponds to N=1 (i.e., no filtering) and if one chooses a larger N, the degree of filtering increases (e.g., if N is equal to the number of strokes in the document, then the "signal" will be a flat line, that is, everything will have been filtered away).

Thus, in accordance with the unfiltered position scoring method 1000 shown in FIG. 10A, the pair-wise difference in vertical (horizontal) positions of strokes of a page are computed in step 1002. The results of this step are illustrated in FIG. 10B, with letter A denoting line breaks and letter B denoting a page break. Next, in step 1004, the stroke(s) for which the pair-wise difference in position having the greatest negative value is found. Then, in step 1006, the mean stroke-index of the negative y strokes is computed.

G. Timestamp Scoring

Figure 11A:
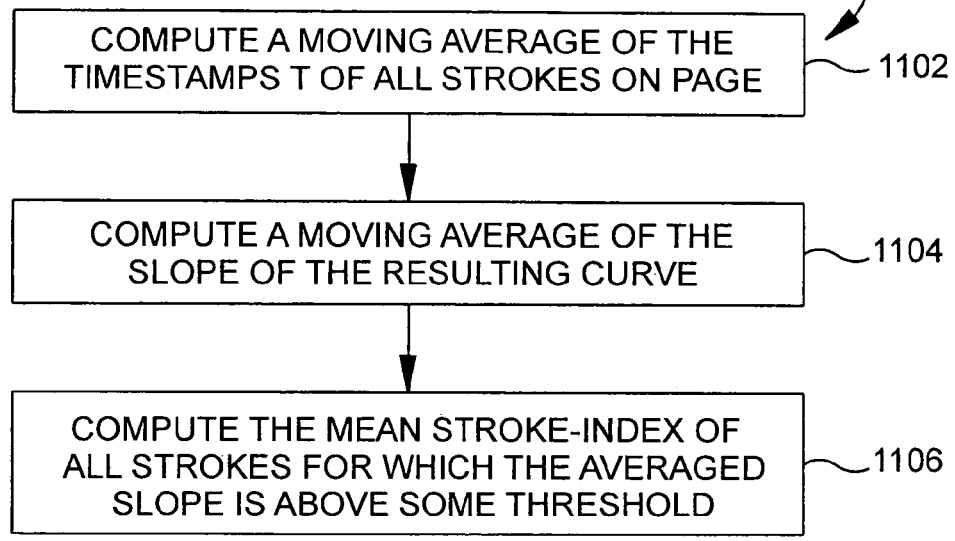
FIGS. 11A through 11C are diagrams illustrating a filtered timestamp scoring method according to one embodiment of the present invention.
Figure 11B:
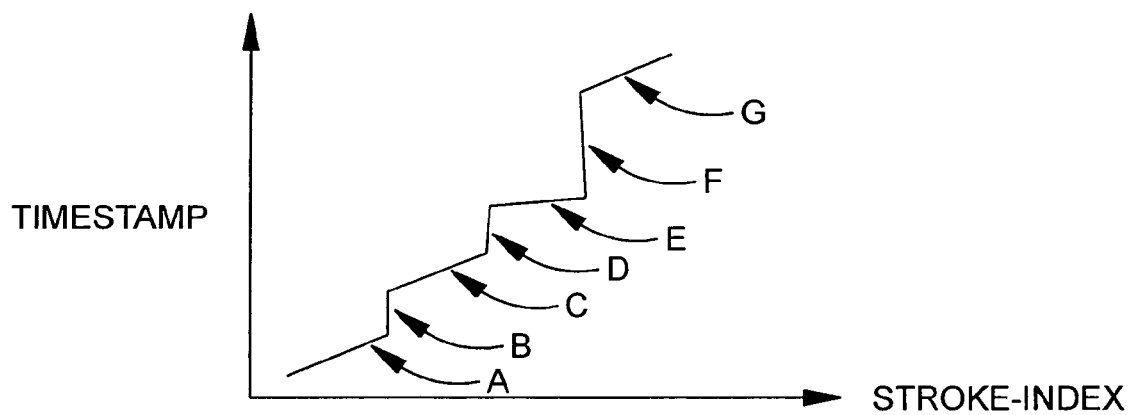
Figure 11C:
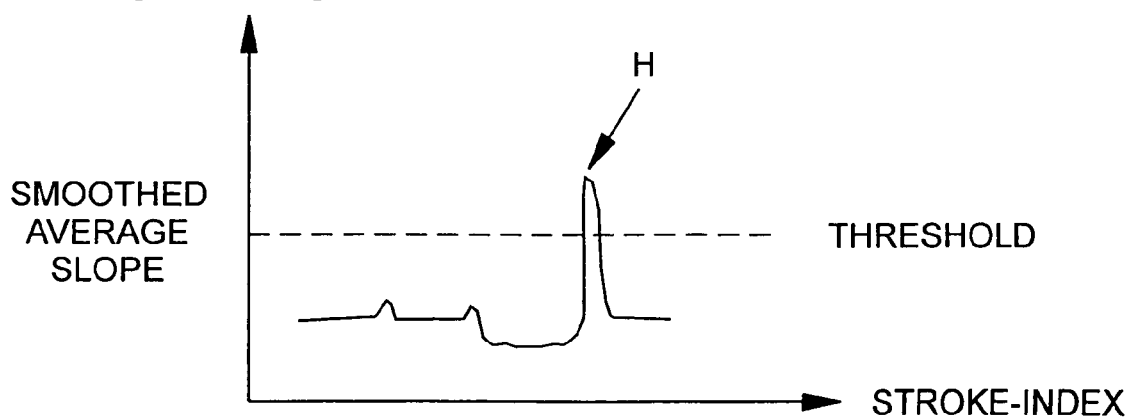

Referring now to FIGS. 11A through 11C, a filtered timestamp scoring method 1100 is shown. It is to be appreciated that filtered timestamp scoring is similar to y-position (x-position) scoring where Y (X) is replaced with T, vertical (horizontal) is replaced with timestamp, and negative is replaced with positive. Thus, in accordance with the timestamp scoring method 1100 shown in FIG. 11A, a moving average is computed of the timestamp T of all strokes on the electronic page in step 1102. The result of step 1102 is illustrated in FIG. 11B, where letters A, C and G denote normal speed writing, B and D denote a short pause, E denotes rapid speed writing and F denotes a large pause. Then, in step 1104, the moving average of the slope of this resulting curve is computed. The result of step 1104 is illustrated in FIG. 11C, with letter H denoting a page break. Then, in step 1106, the mean stroke-index is computed for all the strokes for which the average slope is above some threshold. The positive peaks in the curve computed by the moving average are scored as possible page change events by any of a variety of methods of scoring peak-heights familiar to those skilled in the art. These scores correspond to one of the lists, e.g., lists 48-1 through 48-N, in FIG. 2.

Figure 12A:
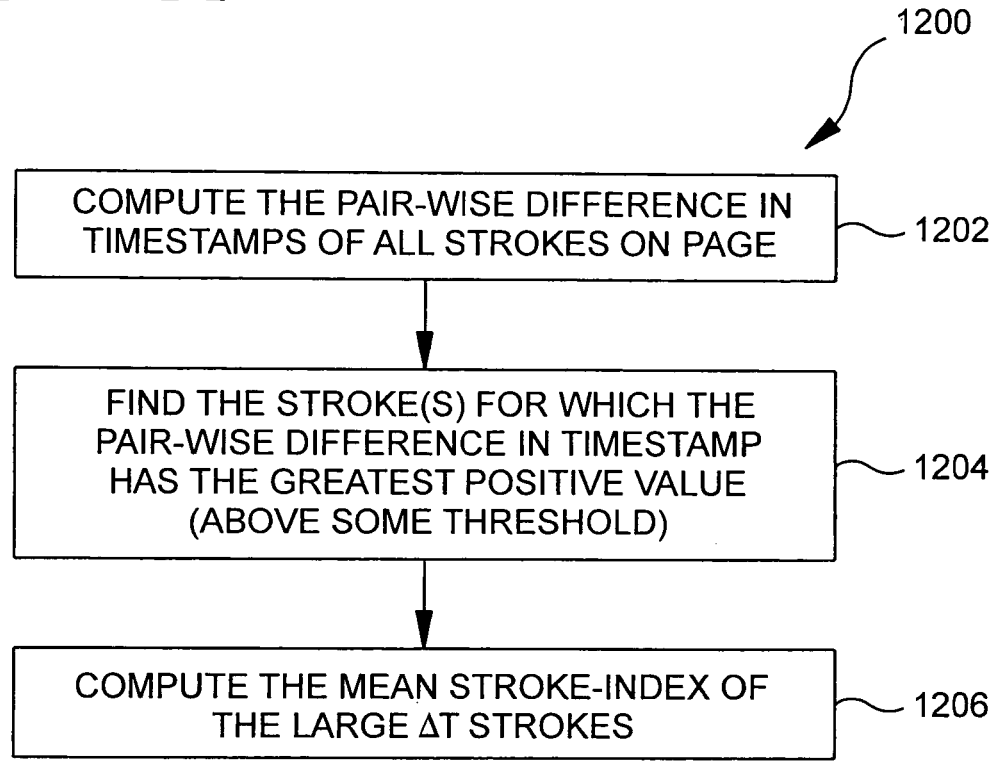
FIGS. 12A and 12B are diagrams illustrating an unfiltered timestamp scoring method according to one embodiment of the present invention.
Figure 12B:
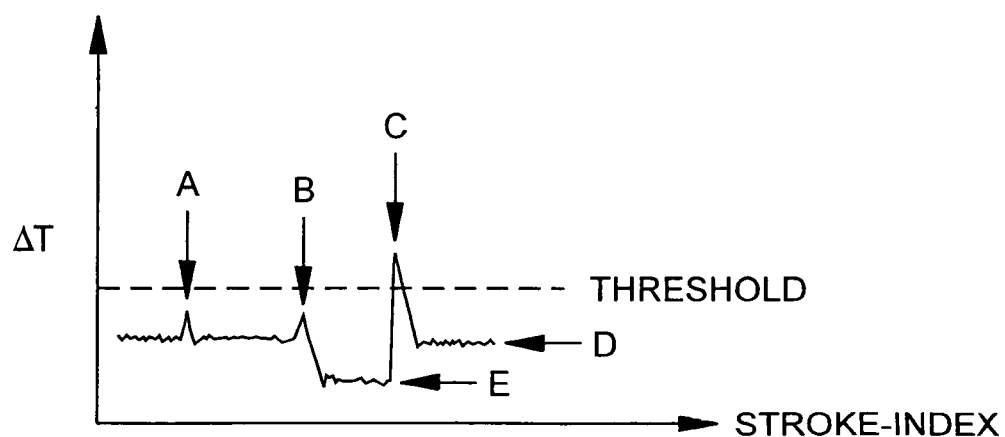

While FIGS. 11A through 11C illustrate a filtered timestamp scoring method, FIGS. 12A and 12B illustrate an unfiltered timestamp scoring method. Thus, in accordance with the unfiltered timestamp scoring method 1200 shown in FIG. 12A, the pair-wise difference in timestamps of strokes of a page are computed in step 1202. The results of this step are illustrated in FIG. 12B, with letters A and B denoting small pauses in writing, C denoting a large pause, D denoting normal speed writing and E denoting rapid speed writing. Next, in step 1204, the stroke(s) for which the pair-wise difference in timestamp having the greatest positive value above some threshold are found. Then, in step 1206, the mean stroke-index of the large T strokes are computed.

H. Neural Network Scoring

Figure 13:
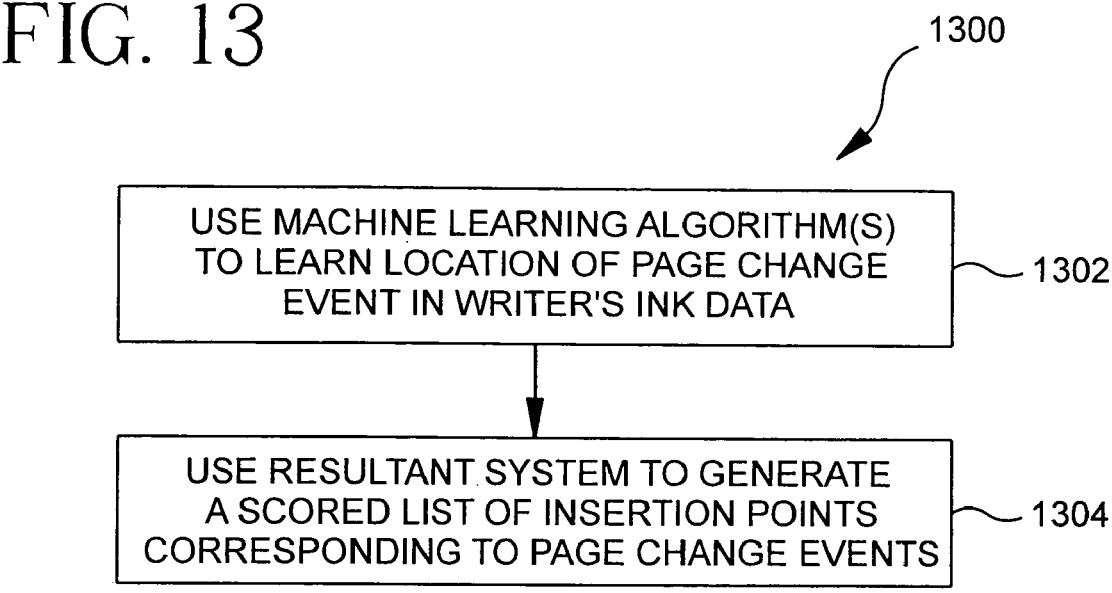
FIG. 13 is a flow diagram illustrating a neural network scoring method according to one embodiment of the present invention.

Referring now to FIG. 13, a flow diagram illustrating a scoring method 1300 referred to as "neural network scoring" is shown. In accordance with the method 1300, the method provides for use of machine learning algorithms known to those skilled in the art to learn the location of page change events in a writer's ink data. For example, one of the machine learning algorithms described in the following references may be employed: S. Haykin, "Neural Networks: A Comprehensive Foundation," Macmillan, New York, 1994; J. Hertz, A. Krogh and R. G. Palmer, "Introduction to the Theory of Neural Computation," Addison Welsley, New York, 1991; L. Breiman, J. H. Friedman, R. A. Olshen and C. J. Stone, "Classification and Regression Trees," The Wadsworth Statistics/Probability Series, Belmont, Calif., 1984; D. E. Rumelhart and J. L. McClelland (ed.), "Parallel Distributed Processing," MIT Press, Cambridge, Mass., 1986; and R. O. Duda and P. E. Hart, "Pattern Classification and Scene Analysis," John Wiley, New York, 1973, the disclosures of which are incorporated by reference herein. Then, in step 1304, the resultant system is used to generate a scored list of insertion points corresponding page change events. It is to be appreciated that the neural network may use the document description information in generating the scored list.

I. Score Combination

Figure 14:
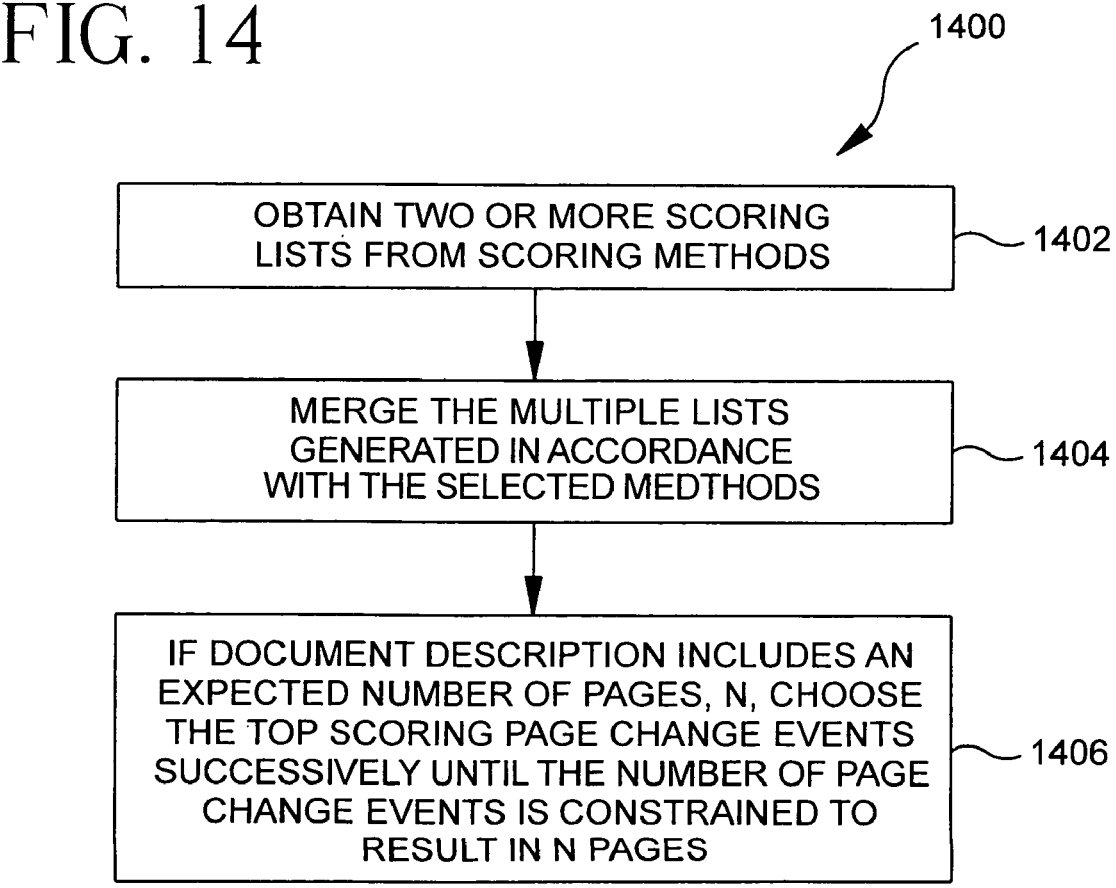
FIG. 14 is a flow diagram illustrating a combination scoring method according to one embodiment of the present invention.

It is to be appreciated that the score combination method to be described in this section may be employed as the score combination method 50 shown in FIG. 2. Recall, however, that if only one scoring method is employed, the score combination operation does not need to be performed. Thus, referring now to FIG. 14, the score combination method 1400 comprises obtaining two or more scoring lists associated with the previously described scoring methods (see sections A through H), in step 1402. As described above, each of the selected methods produces a list whose elements are pairs of the form: (insertion point and probability). It may happen that a given insertion point occurs multiple times in the list. This would be the case if several page break events were omitted by the writer, see, e.g., the definition of the page change event above.

In step 1404, any of a variety of methods known in the art are used to merge the multiple scoring lists. For example, but not limited to, the merging step may comprise: (i) accepting all insertion points, but pruning out duplicates; (ii) using voting to merge insertion points, which may include: "unbiased voting" where each list element gets one vote and insertion points that get more than some fixed number of votes are accepted; or "biased voting" where the score of each list element is used as its vote and insertion points that get more than some fixed sum (or other monotonic functions) of scores are accepted; (iii) using DNFs (disjunctive normal forms) to merge lists; and (iv) using neural nets to merge the lists.

In step 1406, if the document description information (provided to the method 1400) includes an expected number of pages, N, (e.g., if a form is known to have 3 pages, N=3), the top scoring page events are chosen successively until the number of page change events is constrained to result in N pages. For example, if the page change events, ordered by decreasing score, are "++−+−++++−," where "+" is paging forward and "−" is paging backwards, and N=3, then "++" results in a 3 page document, as does "++−+" which correspond to the first two and first four page change events, respectively. Other ordered combinations are disallowed because, by construction (e.g., events are sorted in decreasing score order), they will have lower scores. Similarly, one may consider all possible combinations of page change events which result in the desired number of pages, each of which may be sorted by the sum of the scores of the page change events included.

J. Pre-Processing, Post-Processing Variations

When a user realizes they have forgotten the page change event, they may be asked to label the latest ink, i.e., the ink before which the page break should be found. Further, by this or other methods of augmenting the basic methods described above, the page break can be defined as being at a certain offset in stroke-index from the page break as found by the basic methods described above.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of processing an electronic document generated in accordance with a handwriting system, the method comprising the steps of:

obtaining electronic ink data from the handwriting system, the ink data being associated with the electronic document; and automatically identifying, using at least a portion of the electronic ink data, one or more potential page breaks for possible insertion in the electronic document to maintain a page correspondence between the electronic document and a physical document, also generated in accordance with the handwriting system, and so as to at least partially reduce asynchrony between an electronic page and a physical page;

wherein the step of automatically identifying one or more potential page breaks further comprises the steps of:

measuring a spatial difference between consecutive pairs of strokes made in accordance with the handwriting system; and labeling spatial differences not below a threshold value as possible insertion points.

2. The method of claim 1, further comprising the steps of:

for each spatial difference not below the threshold value, computing one of the number of strokes and the total arc length associated with strokes that occur between the current possible insertion point and one of the next page breaks in the electronic document and the end of the stroke set of the document; and assigning one of the number of strokes and the total arc length as a score to be associated with the possible insertion point.

3. The method of claim 2, wherein the assigning step is performed when one of the number of strokes and the total arc length is not below a second threshold value.

4. A computer-based method of processing an electronic document generated in accordance with a handwriting system, the method comprising the steps of:

obtaining electronic ink data from the handwriting system, the ink data being associated with the electronic document; and automatically identifying, using at least a portion of the electronic ink data, one or more potential page breaks for possible insertion in the electronic document to maintain a page correspondence between the electronic document and a physical document, also generated in accordance with the handwriting system, and so as to at least partially reduce asynchrony between an electronic page and a physical page;

wherein the step of automatically identifying one or more potential page breaks further comprises the steps of:

measuring a temporal difference between consecutive pairs of strokes made in accordance with the handwriting system; and labeling temporal differences not below a threshold value as possible insertion points.

5. The method of claim 4, further comprising the step of, for each temporal difference not below the threshold value, assigning a score to the corresponding possible insertion point based on a distance from the temporal difference to the threshold value.

6. A computer-based method of processing an electronic document generated in accordance with a handwriting system, the method comprising the steps of:

obtaining electronic ink data from the handwriting system, the ink data being associated with the electronic document; and automatically identifying, using at least a portion of the electronic ink data, one or more potential page breaks for possible insertion in the electronic document to maintain a page correspondence between the electronic document and a physical document, also generated in accordance with the handwriting system, and so as to at least partially reduce asynchrony between an electronic page and a physical page;

wherein the step of automatically identifying one or more potential page breaks further comprises the step of identifying as a possible insertion point a point before a stroke, made in accordance with the handwriting system, wherein the stroke falls within a constrained region on a page associated with the document and wherein the stroke is not immediately preceded by another stroke in the same constrained region.

7. A computer-based method of processing an electronic document generated in accordance with a handwriting system, the method comprising the steps of:
obtaining electronic ink data from the handwriting system, the ink data being associated with the electronic document; and
automatically identifying, using at least a portion of the electronic ink data, one or more potential page breaks for possible insertion in the electronic document to maintain a page correspondence between the electronic document and a physical document, also generated in accordance with the handwriting system, and so as to at least partially reduce asynchrony between an electronic page and a physical page;
wherein, in an electronic document that corresponds to a form with fields, the step of automatically identifying one or more potential page breaks further comprises the steps of:
computing a measure of field appropriateness for each stroke made in accordance with the handwriting system to indicate how well a stroke fits within a particular field; and
for N consecutive strokes which do not fit the field of a particular page of the document, identifying a potential page break before these N consecutive strokes.

8. The method of claim 7, wherein the potential page break indicates the page number of the page having a field with which the N consecutive strokes appropriately fit.

9. A computer-based method of processing an electronic document generated in accordance with a handwriting system, the method comprising the steps of:
obtaining electronic ink data from the handwriting system, the ink data being associated with the electronic document; and
automatically identifying, using at least a portion of the electronic ink data, one or more potential page breaks for possible insertion in the electronic document to maintain a page correspondence between the electronic document and a physical document, also generated in accordance with the handwriting system, and so as to at least partially reduce asynchrony between an electronic page and a physical page;
wherein the step of automatically identifying one or more potential page breaks further comprises the steps of:
computing a measure of overlap for each stroke with a previous stroke; and
for N consecutive strokes with a total measure of overlap which is not less than a threshold value, identifying a potential page break before these N consecutive strokes.

10. A computer-based method of processing an electronic document generated in accordance with a handwriting system, the method comprising the steps of:
obtaining electronic ink data from the handwriting system, the ink data being associated with the electronic document; and
automatically identifying, using at least a portion of the electronic ink data, one or more potential page breaks for possible insertion in the electronic document to maintain a page correspondence between the electronic document and a physical document, also generated in accordance with the handwriting system, and so as to at least partially reduce asynchrony between an electronic page and a physical page;
wherein the step of automatically identifying one or more potential page breaks further comprises the steps of:
computing a moving average of spatial positions of strokes, made in accordance with the handwriting system, on a page using a predetermined window width, the computation of the moving average resulting in a spatial position moving average curve;
computing a moving average of a slope associated with the spatial position moving average curve, the computation of the moving average resulting in a slope moving average curve; and
identifying one or more negative slopes in the slope moving average curve as potential page breaks.

11. The method of claim 10, wherein negative slopes are identified as potential page breaks based on peak-heights.

12. A computer-based method of processing an electronic document generated in accordance with a handwriting system, the method comprising the steps of:
obtaining electronic ink data from the handwriting system, the ink data being associated with the electronic document; and
automatically identifying, using at least a portion of the electronic ink data, one or more potential page breaks for possible insertion in the electronic document to maintain a page correspondence between the electronic document and a physical document, also generated in accordance with the handwriting system, and so as to at least partially reduce asynchrony between an electronic page and a physical page;
wherein the step of automatically identifying one or more potential page breaks further comprises the steps of:
computing a moving average of temporal positions of strokes, made in accordance with the handwriting system, on a page using a predetermined window width, the computation of the moving average resulting in a temporal position moving average curve;
computing a moving average of a slope associated with the temporal position moving average curve, the computation of the moving average resulting in a slope moving average curve; and
identifying one or more positive slopes in the slope moving average curve as potential page breaks.

13. The method of claim 12, wherein positive slopes are identified as potential page breaks based on peak-heights.

14. A computer-based method of processing an electronic document generated in accordance with a handwriting system, the method comprising the steps of:
obtaining electronic ink data from the handwriting system, the ink data being associated with the electronic document; and
automatically identifying, using at least a portion of the electronic ink data, one or more potential page breaks for possible insertion in the electronic document to maintain a page correspondence between the electronic document and a physical document, also generated in accordance with the handwriting system, and so as to at least partially reduce asynchrony between an electronic page and a physical page;
wherein the step of automatically identifying one or more potential page breaks further comprises the steps of:
performing two or more scoring procedures, each scoring procedure generating a list whose elements include a possible insertion point and a corresponding score;
merging the lists generated by the two or more scoring procedures to form a combined list; and selecting one or more top scoring possible insertion points as the one or more potential page breaks.

15. The method of claim 14, wherein the selecting step further comprises selecting a number of top scoring possible insertion points to match the number of expected pages of the document.

16. The method of claim 14, wherein the merging step further comprises merging the lists by one of (i) accepting all possible insertion points except duplicates; (ii) unbiased voting; (iii) biased voting; (iv) using disjunctive normal forms; and (v) using neural networks.

* * * * *